US008108292B1

(12) United States Patent
Borowski

(10) Patent No.: US 8,108,292 B1
(45) Date of Patent: Jan. 31, 2012

(54) ASSET REALLOCATION

(75) Inventor: William F. Borowski, Millbury, MA (US)

(73) Assignee: Bank of America Corporation, Charlotte, NC (US)

( * ) Notice: Subject to any disclaimer, the term of this patent is extended or adjusted under 35 U.S.C. 154(b) by 408 days.

(21) Appl. No.: 12/550,835

(22) Filed: Aug. 31, 2009

(51) Int. Cl.
*G06Q 40/00* (2006.01)
(52) U.S. Cl. ......................................................... 705/37
(58) Field of Classification Search ....................... 705/37
See application file for complete search history.

(56) References Cited

U.S. PATENT DOCUMENTS

2005/0187840 A1  8/2005  Stiff et al.

OTHER PUBLICATIONS

Yates, T.: Reinvesting Capital Gains in Leveraged Portfolios, Investopedia, Aug. 20, 2007, pp. 1-5.*
Piazza, J.: Rebalancing Your Portfolio, Mar. 1, 2003, pp. 1-4.*

* cited by examiner

*Primary Examiner* — Bijendra K Shrestha
(74) *Attorney, Agent, or Firm* — Moore & Van Allen PLLC; W. Kevin Ransom

(57) ABSTRACT

Embodiments of the present invention relate to systems, methods and computer program products for automatically reallocating assets by directing assets from a primary fund to secondary fund, where the primary and secondary funds have distinct but complementary investment strategies. For example, to reallocate assets held in a primary portfolio of a mutual fund, embodiments of the present invention create a secondary portfolio within the mutual fund. Then, using earnings from the primary portfolio, embodiments of the present invention purchase at least one asset to be held in the secondary portfolio and grow that asset by continuing to direct earnings from the primary portfolio to the secondary portfolio. When the asset reaches a predetermined size, embodiments of the present invention transfer the asset to a newly created and separately managed mutual fund.

21 Claims, 3 Drawing Sheets

ASSET REALLOCATION

FIELD

In general, embodiments of the present invention relate to systems, methods and computer program products for reallocating assets by using capital gains and dividends from some assets to invest in other assets.

BACKGROUND

As explained by the Securities and Exchange Commission (SEC) in its publication entitled "Invest Wisely: Introduction to Mutual Funds," a mutual fund is a company that pools money from many investors and invests the money in stocks, bonds, short-term money-market instruments, other assets, or some combination of these investments. The combined holdings the mutual fund owns are known as its portfolio. Each share represents an investor's proportionate ownership of the fund's holdings and the income those holdings generate.

Investors often turn to mutual funds to save for retirement and to achieve other financial goals because mutual funds can offer the advantages of diversification and professional management at an affordable price. Mutual funds accommodate investors who have modest sums of money to invest by setting relatively low dollar amounts for initial purchases, subsequent monthly purchases, or both. Accordingly, many investors find it easier to achieve diversification through ownership of mutual funds, rather than through ownership of individual stocks or bonds. For example, when invested in mutual funds, investors benefit from the stewardship of professional money managers who research, select, and monitor the performance of the securities the fund purchases. Additionally, these professional managers diversify the fund's portfolio by spreading the fund's investments across a wide range of assets.

However, even though mutual funds can offer diversification at affordable prices, there are literally thousands of mutual funds from which investors can choose. These funds have varying investment strategies and assume varying amounts of risk. Most mutual funds fall into one of three main categories: money market funds, bond funds, or stock funds. Each type has different features and different risks and rewards. Generally, the higher the potential return, the higher the risk of loss.

Money market funds have relatively low risks, compared to other mutual funds. By law, they can invest in only certain high-quality, short-term investments issued by the U.S. government, U.S. corporations, and state and local governments. Investor losses have been rare, but they are possible. Money market funds pay dividends that generally reflect short-term interest rates, and historically the returns for money market funds have been lower than for either bond or stock funds. Inflation risk, which is the risk that inflation will outpace and erode investment returns over time, can be a potential concern for investors in money market funds.

Bond funds generally have higher risks than money market funds, largely because they typically pursue strategies aimed at producing higher yields. Unlike money market funds, applicable laws do not restrict bond funds to high-quality or short-term investments. Because there are many different types of bonds, bond funds can vary dramatically in their risks and potential rewards. Some of the risks associated with bond funds include the risk that one or more of the borrows whose debt makes up the fund is unable to repay the amount loaned, the risk that interest rates will rise above the interest rate paid by bonds making up the portfolio, and the risk that the borrowers whose debt makes up the fund will prepay the amounts owed.

Although a stock fund's value can rise and fall quickly and dramatically over the short term, historically stocks have performed better over the long term than other types of investments, including corporate bonds, government bonds, and treasury securities. The market risk poses the greatest potential risk for investors in stocks funds. Stock prices can fluctuate for a broad range of reasons, such as the overall strength of the economy or demand for particular products or services.

Within the broad category of stock funds, there are subcategories having varying investment strategies and risk tolerances. For example, growth funds focus on stocks that may not pay a regular dividend but have the potential for large capital gains. Income funds invest in stocks that pay regular dividends. Index funds aim to achieve the same return as a particular market index, such as the S&P 500, by investing in all of the companies included in an index. Sector funds may specialize in a particular industry segment, such as technology or consumer products stocks.

Some investors are confused by the complexities of the multiple investment choices that are available. However, to achieve long-term financial goals, it is sometimes necessary for investors to invest in multiple mutual funds, each having a different investment strategy. Further, as investors progress through their lifecycle toward their long-term financial goals, asset reallocation is necessary. For example, many investors reallocate their assets to more conservative investments as they approach retirement by shifting some investments from stock funds to bond funds or from bond funds to money market funds. However, effective asset reallocation is difficult and many investors fail to properly reallocate.

As explained by the SEC in its Beginners' Guide to Asset Allocation, Diversification, and Rebalancing, to accommodate investors who prefer to use one investment to save for a particular investment goal, such as retirement, without having to worry about the complexities of asset reallocation, some mutual fund companies offer a product known as a "lifecycle fund." A lifecycle fund is a diversified mutual fund that automatically reallocates towards a more conservative mix of investments as it approaches a particular year in the future, known as its "target date." A lifecycle fund investor picks a fund with the right target date based on his or her particular investment goal. The managers of the fund then make decisions about asset allocation, diversification, and rebalancing based on what they think is best for the collective group of investors who own the fund.

However, because life cycle funds become very large over the years and become subject to more and more regulatory constraints, these funds become difficult to manage. The constraints limit managers flexibly when reallocating, diversifying, and rebalancing assets. Further, lifecycle funds may not always be an appropriate investment for some investors because changes over time in the funds' overall asset allocation mixes may not match an investor's individual financial goals.

SUMMARY

Embodiments of the present invention relate to systems, methods and computer program products for automatic asset reallocation by using capital gains and dividends from some assets to invest in other assets. For example, to reallocate assets held in a primary portfolio of a mutual fund, embodiments of the present invention create a secondary portfolio within the mutual fund. Then, using earnings, such as capital gains and dividends, from the primary portfolio, embodiments of the present invention purchase at least one asset to be held in the secondary portfolio and grow that asset by continuing to direct earnings from the primary portfolio to the secondary portfolio. When the asset reaches a predetermined size, embodiments of the present invention transfer the asset to a newly created and separately managed mutual fund.

In sum, the present invention removes the complexities of asset reallocation, while still providing a balanced and diversified investment mix, by automatically establishing and growing a secondary portfolio—which may include conservative assets, such as bonds and cash—with capital gains and dividends earned by more aggressive assets, such as stocks, that are held in a primary portfolio of a mutual fund. When the secondary portfolio grows to a predetermined size, the present invention splits off the secondary portfolio from the mutual fund and uses secondary portfolio establish a separately managed mutual fund and gives the owners of the original fund proportional ownership of the separately managed fund. Accordingly, embodiments of the present invention reallocate assets of a mutual fund by using its capital gains and dividends to establish separately a managed fund having a different investment strategy. Having several smaller funds rather than a single large fund gives fund managers more flexibility and enables more effective management.

According to some embodiments, a system is provided for reallocating assets held in a primary portfolio of an original mutual fund. The system comprises a processor configured to execute an asset-reallocation application for automatically reallocating assets held in the primary portfolio of the original mutual fund. The asset-reallocation application executed by the processor is configured to: create a secondary portfolio within the original mutual fund; purchase at least one asset to be held in the secondary portfolio using earnings from the primary portfolio; grow the asset held in the secondary portfolio by directing earnings from the primary portfolio to the secondary portfolio; create a separate mutual fund; and transfer the asset from the secondary portfolio of the original mutual fund to a primary portfolio of the separate mutual fund when the asset reaches a predetermined size. According to some embodiments, the assets of the primary portfolio of the original mutual fund are stocks, the asset of the secondary portfolio is a conservative income product, the primary portfolio of the original mutual fund has a growth strategy, the separate mutual fund has an income strategy, and the original mutual fund and the separate mutual fund are separately managed.

According to some embodiments, the asset-reallocation application executed by the processor is further configured to: after transferring the asset from the original mutual fund's secondary portfolio to the separate mutual fund's primary portfolio, purchase at least a second asset to be held in the original mutual fund's secondary portfolio using earnings from the original mutual fund's primary portfolio; create a second separate mutual fund; and transfer the second asset from the original mutual fund's secondary portfolio to the second separate mutual fund when the second asset reaches a predetermined size.

According to some embodiments, the asset-reallocation application executed by the processor is further configured to: create a secondary portfolio within the separate mutual fund; purchase at least a second asset to be held in the separate mutual fund's secondary portfolio using earnings from the separate mutual fund's primary portfolio; create a second separate mutual fund; and transfer the second asset from the separate mutual fund's secondary portfolio to the second separate mutual fund when the second asset reaches a predetermined size.

According to some embodiments, a system is provided that comprises: a processor configured to execute an asset-reallocation application. The asset-reallocation application executed by the processor is configured to: seed a secondary portfolio within a mutual fund using gains earned by a primary portfolio of the mutual fund; grow the secondary portfolio over time by continuing to direct gains from the primary portfolio to the secondary portfolio; and split off the secondary portfolio from the mutual fund when the secondary portfolio reaches a predetermined size. According to some embodiments, the asset-reallocation application executed by the processor is further configured to: after the secondary portfolio has been split off, seed a third portfolio within the mutual fund using gains earned by the primary portfolio of the mutual fund; grow the third portfolio over time by continuing to direct gains from the primary portfolio to the third portfolio; and split off the third portfolio from the mutual fund when the third portfolio reaches a predetermined size.

According to some embodiments, the asset-reallocation application executed by the processor is further configured to continue seeding and growing additional portfolios within the mutual fund using the primary portfolio's gains. According to some embodiments, the asset-reallocation application executed by the processor is further configured to: establish the secondary portfolio as a separate mutual fund; seed a third portfolio within the separate mutual fund using gains earned by the secondary portfolio of the separate mutual fund; grow the third portfolio over time by continuing to direct gains from the secondary portfolio to the third portfolio; and split off the third portfolio from the separate mutual fund when the third portfolio reaches a predetermined size.

According to some embodiments, a method is provided that comprises using a processor to reallocate a portion of a mutual fund's assets by: establishing a conservative portion of the mutual fund by allocating gains earned by a growth portion of the mutual fund to the conservative portion; growing the conservative portion over time by investing gains from the growth portion in the conservative portion; and creating a separate mutual fund by separating the conservative portion from the mutual fund when the conservative portion reach a predetermined size. According to some embodiments, the method further comprises using the processor to: after the separating the conservative portion from the mutual fund, establishing a second conservative portion of the mutual fund by allocating gains earned by the growth portion of the mutual fund to the second conservative portion; growing the second conservative portion over time by directing gains from the growth portion to the conservative portion; and creating a second separate mutual fund by separating the second conservative portion from the mutual fund when the second conservative portion reaches a predetermined size. According to some embodiments, the method further comprises using the processor to establish and grow additional conservative portion by continuing to invest gains earned by the growth portion of the primary fund's portfolio.

According to some embodiments, a method is provided for reallocating assets held in a primary portfolio of an original mutual fund. The method comprises: creating a secondary portfolio within the original mutual fund; purchasing at least one asset to be held in the secondary portfolio using earnings from the primary portfolio; growing the asset by directing earnings from the primary portfolio to the secondary portfolio; creating a separate mutual fund; and transferring the asset from the secondary portfolio of the original mutual fund to a primary portfolio of the separate mutual fund when the asset reaches a predetermined size. According to some embodiments, the assets of the primary portfolio of the original mutual fund are stocks, the asset of the secondary portfolio is a conservative income product, the primary portfolio of the original mutual fund has a growth strategy, the separate mutual fund has an income strategy, and the original mutual fund and the separate mutual fund are separately managed.

According to some embodiments, the method further comprises: after transferring the asset from the original mutual fund's secondary portfolio to the separate mutual fund's primary portfolio, purchasing at least a second asset to be held in the original mutual fund's secondary portfolio using earnings from the original mutual fund's primary portfolio; creating a second separate mutual fund; and transferring the second asset from the original mutual fund's secondary portfolio to the second separate mutual fund when the second asset reaches a predetermined size. According to some embodiments, the method further comprises: creating a secondary portfolio within the separate mutual fund; purchasing at least a second asset to be held in the separate mutual fund's secondary portfolio using earnings from the separate mutual fund's primary portfolio; creating a second separate mutual fund; and transferring the second asset from the separate mutual fund's secondary portfolio to the second separate mutual fund when the second asset reaches a predetermined size.

BRIEF DESCRIPTION OF THE DRAWINGS

Figure 1:
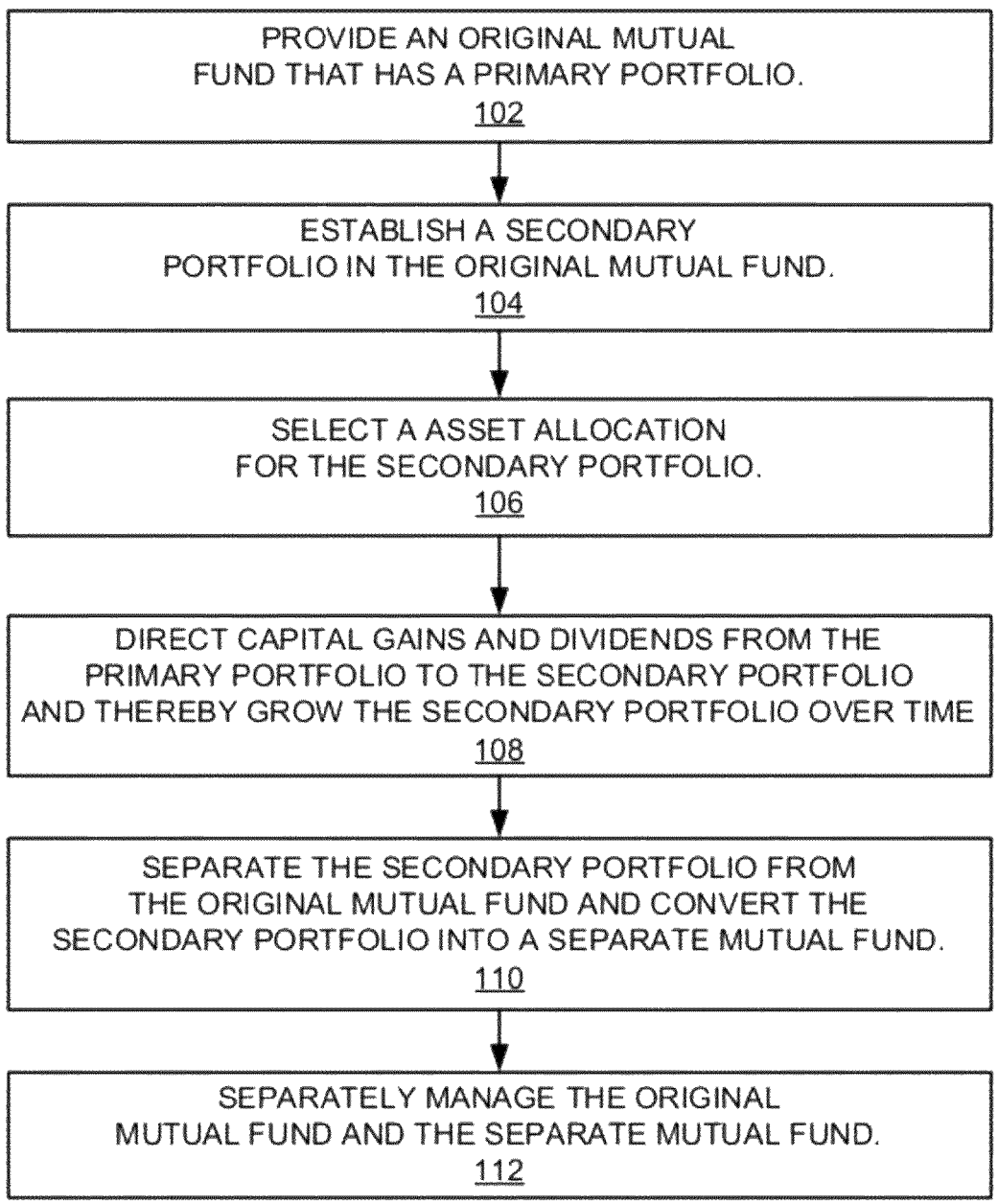
Figure 2:
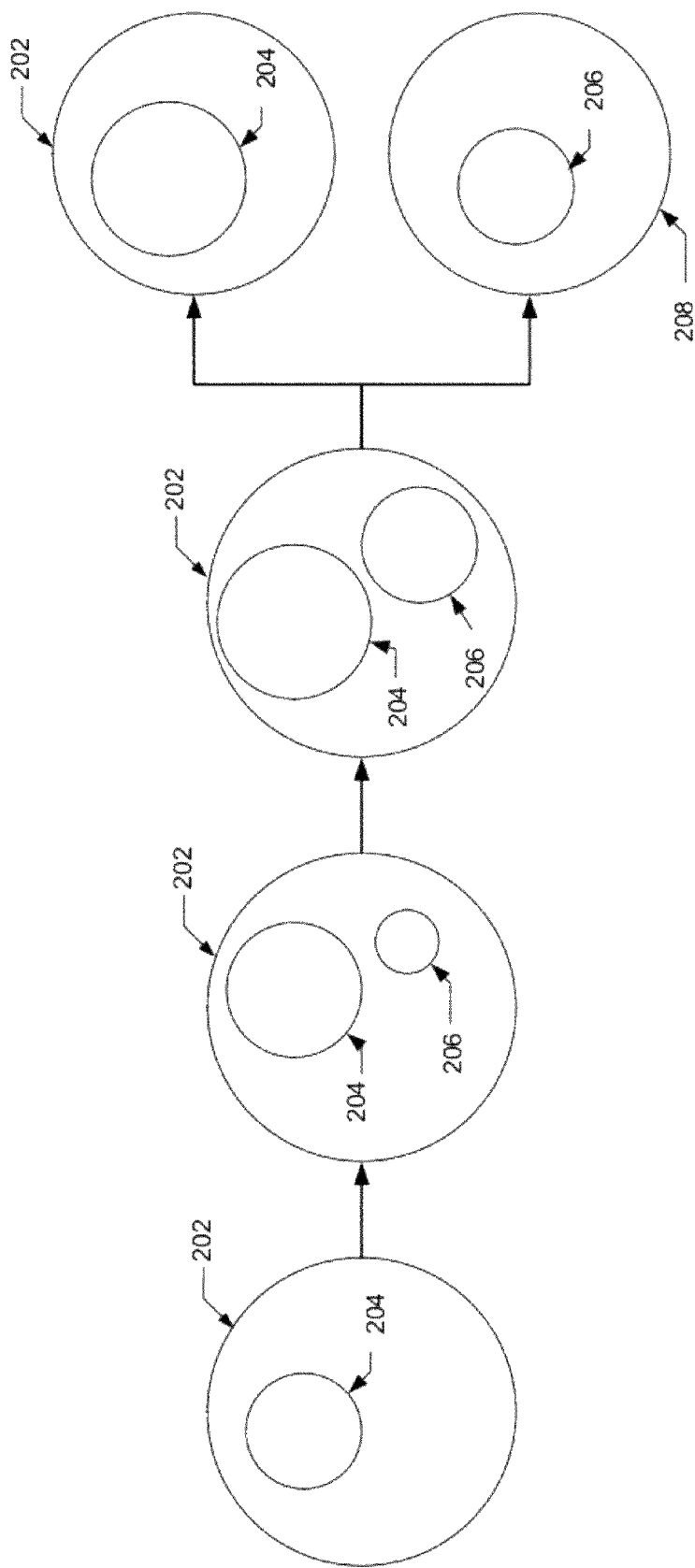
Figure 3:
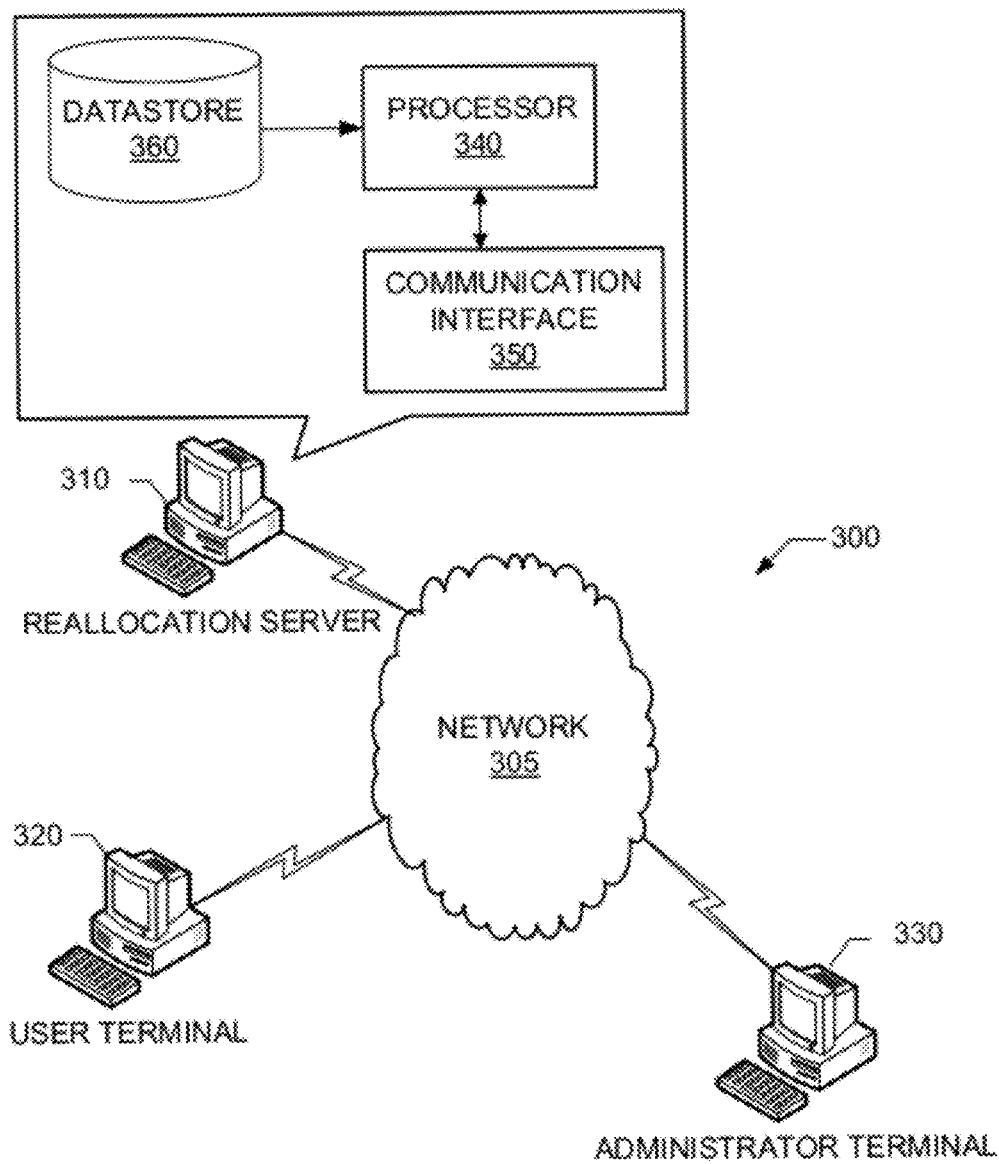

Having thus described embodiments of the invention in general terms, reference will now be made to the accompanying drawings wherein:

FIG. 1 is a flow chart illustrating an exemplary process of reallocating by using capital gains from some assets of a mutual fund to invest in other assets and establish a separately managed mutual fund, according to an embodiment of the present invention;

FIG. 2 is a diagram that illustrates reallocating a mutual fund's assets over time to establish a separate mutual fund, according to an embodiment of the present invention; and FIG. 3 illustrates an environment in which the processes described herein are implemented, according to an embodiment of the present invention.

DETAILED DESCRIPTION OF EMBODIMENTS OF THE INVENTION

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

For illustrative convenience, the present invention will be described herein as being applied by a mutual fund manager to reallocate the assets of a mutual fund over time. It should be appreciated, however, that embodiments of the present invention could be applied by any institution or business, or non-business entity or portion thereof, to reallocate the assets of any investment portfolio that comprises any number of different categories of assets.

As discussed above, a mutual fund's portfolio may include a vast array of investment products. For example, mutual funds may own stocks, corporate and municipal bonds, cash or cash equivalents, U.S. Treasury securities, real estate, commodities, and private equity. Many mutual funds' portfolios include a mix of three major asset categories: stocks, bonds, and cash. These three major asset categories are briefly discussed in turn below.

As explained by the SEC in its Beginners' Guide to Asset Allocation, Diversification, and Rebalancing, stocks historically have the greatest risk and highest returns among the three major asset categories. As an asset category, stocks offer the greatest potential for growth, but also the greatest potential for loss. The volatility of stocks makes them a very risky investment for investors that have financial goals with short term horizons. Large company stocks, for example, have periods where they decrease in value, but investors that are able hold the stock for a long period of time are often rewarded with strong positive long-term returns.

Bonds, according to the SEC, are generally less volatile than stocks, but typically yield smaller returns. As a result, an investor whose financial goal has a short time horizon might increase his or her bond holdings relative to his or her stock holdings because the reduced risk of holding more bonds would be attractive to the investor despite their lower potential for growth.

Cash and cash equivalents, according to the SEC, include savings deposits, certificates of deposit, treasury bills, money market deposit accounts, and money market funds. Cash and cash equivalents are the safest investments, but offer the lowest return of the three major asset categories. The chances of losing money on an investment in this asset category are generally low. To further reduce the chances of losing money, the United States government guarantees many investments in cash equivalents up to a certain amount. The principal concern for investors investing in cash equivalents is inflation risk, not losses. This is the risk that inflation will outpace and erode investment returns over time.

Because stocks, bonds, and cash are the most common asset categories and because these asset categories are often included in mutual fund portfolios, the present invention will be primarily described with reference to mutual funds having portfolios consisting of these asset categories. However, it should be appreciated that the invention contemplates the fact that fund managers may select other asset categories, including real estate, commodities, and private equity.

According to the SEC, it is important to allocate investments among the different asset categories. Historically, the returns of the three major asset categories have not moved up and down at the same time. Market conditions that cause one asset category to do well often cause another asset category to have average or poor returns. As such, by allocating the assets of a mutual fund's portfolio among the three asset categories, where the asset categories have investment returns that move up and down under different market conditions, a fund manager can protect the mutual fund's investors against significant losses. This loss protection occurs because, if one asset category's investment return falls, the mutual fund will be in a position to counteract losses in that asset category with better investment returns in another asset category.

Additionally, according to the SEC, asset allocation is important because it impacts whether an investor will meet his or her financial goals. If an investor's portfolio is too conservative, his or her investments may not earn a large enough return to meet his or her financial goals. For example, if a mutual fund is designed to help investors save for a long-term goal, such as retirement, some financial experts agree that the mutual fund will initially need to have an asset allocation that is weighted toward stocks and then, as the investors' financial goal approaches, shift toward bonds and cash.

Turning now to FIG. 1, an exemplary reallocation process 100 is provided for reallocating the assets held in a mutual fund's investment portfolio, thereby helping those investors who own shares of the mutual fund reallocate their assets and meet their financial goals. As a general overview, the reallocation process 100, according to some embodiments, involves growing the assets of an original mutual fund to a predetermined value and/or for a predetermined period of time. Then the reallocation process 100 involves creating a separate spin-off mutual fund and capitalizing the spin-off fund with assets taken from original fund. Investors who own shares of the original mutual fund are given proportional ownership in the spin-off fund. Accordingly, after the spin-off fund is created, the original fund and the separate spin-off fund combine to provide an overall asset allocation. The allocation process 100 further involves selecting an allocation of stocks, bonds, and cash for the spin-off fund that complements the original fund's asset allocation and that provides an overall asset allocation that helps investors achieve their financial goals.

With reference to FIGS. 1 and 2, the allocation process 100 will now be described in more detail. As represented by block 102, the process 100 generally begins with providing an original mutual fund 202 having a primary portfolio 204 that has an asset allocation that is consistent with the particular goals of the fund 202. For example, in the event the original fund 202 is designed to help young investors save for retirement, the asset allocation of primary portfolio 204 is weighted more toward stocks than bonds and cash because young investors saving for retirement have a long time horizon and are able to endure short-term volatility in exchange for long-term gains. However, in the event the original fund 202 is designed to help older investors prepare for retirement or families save for a house down payment, the asset allocation of the primary portfolio 204 is weighted more toward bonds and cash than stocks because these investors have a short time horizon and are unable to endure the volatility of stocks.

Next, at block 104, the process 100 provides for establishing a secondary portfolio 206 within the original fund 202. According to some embodiments, the secondary portfolio 206 is established using capital gains and dividends from the primary portfolio 204. That is, instead of reinvesting or distributing to shareholders the capital gains and dividends earned by the assets held in the primary portfolio 204, the capital gains and dividends are used to purchase assets for establishing the secondary portfolio 206.

In block 106, the process 100 provides for selecting an asset allocation for the secondary portfolio 206. According to some embodiments, in the case of aggressive investors and in the case of conservative investors, the asset allocation of the secondary fund 206 is designed to hedge against the asset allocation of the primary fund 204, and the asset allocation of the secondary portfolio 206 is different than, but complementary to, the asset allocation of the primary portfolio 204. For example, in the case where the original fund 202 is designed to help young investors save for retirement, the asset allocation of the secondary portfolio 206 is more conservative than that of the primary portfolio 204. In this case the asset allocation of the primary portfolio 204 is likely to be directed more toward higher risk assets, such as stocks, whereas the asset allocation of the secondary portfolio 206 is more likely to be directed toward more conservative assets, such as bonds and cash. Also for example, in cases where the asset allocation of the primary portfolio 204 is directed to conservative assets, such as bonds and cash, the asset allocation of the secondary portfolio 206 is directed toward an even more conservative allocation of bonds and cash. According to some embodiments, the primary portfolio 204 is referred to as a growth portion of the original fund 202 and the secondary portfolio 206 is referred to as a conservative portion of the original fund 202.

When selecting an asset allocation for the secondary portfolio 206, embodiments of the reallocation process 100 consider two major factors: the time horizon and risk tolerance. Time horizon is the expected number of months, years, or decades the investors are willing and able to be investing to achieve their particular financial goal. Investors that have longer time horizons generally feel more comfortable taking on a riskier, or more volatile, asset mixture because they can wait out slow economic cycles and the inevitable ups and downs of the markets. On the other hand, investors for whom retirement is quickly approaching are generally likely to accept less risk because they have a shorter time horizon. Risk tolerance represents investors' ability and willingness to lose some or all of their original investment in exchange for greater potential returns.

For aggressive investors having a high-risk tolerance and/or a financial goal with a long time horizon, the reallocation process 100, as represented at block 106 and according to some embodiments, selects an asset allocation for the secondary portfolio 206 that consists of assets with greater risk, like stocks or bonds, rather than restricting the secondary portfolio 206 to assets with less risk, like cash equivalents. However, in this case, despite having a fairly aggressive asset allocation, the secondary portfolio 206 is still less aggressive than the primary portfolio 204. On the other hand, for more conservative investors having a low-risk tolerance and/or a financial goal with a short time horizon, the reallocation process 100, as represented at block 106 and according to some embodiments, selects an asset allocation for the secondary portfolio 206 that consists more of asset categories with less risk, such as cash.

As indicated at block 108, the process 100 further involves growing the secondary portfolio 206 of the original fund 202. According to some embodiments, the process 100 grows the secondary portfolio 206 by continuing to invest capital gains and dividends from the primary portfolio 204 in the assets of the secondary portfolio 206. Further, according to some embodiments, the process 100 also grows the secondary portfolio 206 by reinvesting capital gains and dividend earned by the assets of the secondary portfolio 206 instead of distributing those capital gains and dividends to investors. It should be appreciated, however, that instead of reinvesting capital gains and dividends earned by the assets of the secondary portfolio 206, the process 100 involves using those capital gains and dividends to establish a third portfolio having an asset allocation that even further diversifies the original fund 202.

Growing the secondary portfolio 206 over time by continuing to direct capital gains and dividends from the more aggressive primary portfolio 204 to the more conservative secondary portfolio 206 is, in effect, a gradual overall reallocation of the original fund 202. This gradual reallocation of the original fund 202 coincides with the gradual time horizon change of the investors who own the original fund 202. The rationale for reallocating to more conservative assets over time is well know and accepted. For example, as explained by the SEC in its Beginners' Guide to Asset Allocation, Diversification, and Rebalancing, investors should adjust their asset allocation as their time horizon changes. In other words, as an investor gets closer to his or her investment goal, she or he will likely need to change his or her asset allocation. For example, most people investing for retirement hold less stock and more bonds and cash equivalents as they get closer to retirement age.

As indicated at block 110, once the assets of secondary portfolio 206 reach a predetermined amount, such as twenty-five percent of the value of assets held in the primary portfolio 204, the secondary portfolio 206 is separated from the original mutual fund 202 and used to establish a separately managed spin-off mutual fund 208. The investors who own shares of the original fund 202 are automatically given proportional ownership in the spin-off fund 208. Rather than managing the original fund 202 and the spin-off fund 208 together a single fund, the process 100, as indicated at block 112, involves separately managing the funds 202 and 208. Accordingly, the funds 202, 208 will be relatively small and will have different managers managing pursuant to different investment philosophies. According, these relatively small funds will have more flexibility because they will be subject to less regulation than if they were combined in to a single large fund.

FIG. 4 illustrates a computer-based asset-reallocation system 400 in which the process 100 may be implemented, according to one embodiment of the invention. As illustrated in FIG. 4, the asset-reallocation system 400 generally includes a reallocation server 410 communicably coupled to one or more user terminals 420 and one or more administrator terminals 430 via a network 405. In one embodiment, the user and administrator terminals 420, 430 include personal computers or mobile terminals that communicate with the reallocation server 410 using the Internet and a web browser application.

As further illustrated in FIG. 4, the reallocation server 410 includes a processor 440 operatively coupled to a communication interface 450 and a memory system 460. The processor 440 executes the process 100 and graphically displays outputs on the graphical user interface of the user terminal 420. The communication interface 450 communicates information to and from the network 405 and, in some embodiments, to and from users and administrators. The memory system 460 may include any type of computer-readable medium for storing computer-executable instructions, such as computer-executable instructions that embody the process 100. The processor 440 is configured to execute the computer-executable instructions stored in the memory system 460 and, thereby, use the communication interface 450 to communicate information to and from the user and administrator terminals 420, 430 and store or retrieve information in the memory system 460.

It should be appreciated that the communication network 405 could be a wide area network, including the Internet, a local area network or intranet, a wireless network, etc. It should also be appreciated that when components are described herein as communicating over a network, the components may be directly coupled to each other, or indirectly coupled via one or more other components.

Furthermore, although the asset-reallocation system 400 is described herein as comprising separate components, these components need not be separate and distinct from one another, and two or more of such components may, in some embodiments, be combined into a single component that performs all of the functions of the multiple components so combined as described herein. For illustrative convenience, embodiments of the present invention are described herein where the user terminal 420 and the administrator terminal 430 constitute a part of the asset-reallocation system 400. It should be appreciated, however, that the asset-reallocation system 400 is not limited to a system that includes these components.

As will be appreciated by one of skill in the art, embodiments of the invention may include a method (including a business process), system, computer program product, or a combination of the foregoing. Accordingly, some embodiments of the present invention or portions thereof may even take the form of an entirely hardware embodiment, an entirely software embodiment (including firmware, resident software, micro-code, etc.), or an embodiment combining software and hardware aspects that may, in some instances, be referred to herein as a "system." Furthermore, embodiments of the present invention, or portions thereof, may take the form of a computer program product on a computer-readable medium having computer-usable program code embodied in the medium.

In such embodiments, any suitable computer-readable medium may be utilized. The computer-readable medium may be, for example but not limited to, an electronic, magnetic, optical, electromagnetic, infrared, or semiconductor system, apparatus, or device. More specific examples of the computer-readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

Computer program code for carrying out operations of embodiments of the present invention may be written in an object-oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that at least some blocks of the flowchart illustrations and/or block diagrams, and/or combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture, including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for reallocating assets held in a primary portfolio of an original mutual fund, the system comprising:
a processor configured to execute an asset-reallocation application for automatically reallocating assets held in the primary portfolio of the original mutual fund,
wherein the asset-reallocation application executed by the processor is configured to:
create a secondary portfolio within the original mutual fund;
purchase at least one asset to be held in the secondary portfolio using earnings from the primary portfolio;
grow the asset held in the secondary portfolio by directing earnings from the primary portfolio to the secondary portfolio;
create a separate mutual fund;
transfer the asset from the secondary portfolio of the original mutual fund to a primary portfolio of the separate mutual fund when the asset reaches a predetermined size; and
continue to create and grow additional portfolios within the original mutual fund by directing earnings from the primary portfolio to the additional portfolios.

2. The system of claim 1, wherein the assets of the primary portfolio of the original mutual fund are stocks.

3. The system of claim 1, wherein the asset of the secondary portfolio is a conservative income product.

4. The system of claim 1, wherein the primary portfolio of the original mutual fund has a growth strategy.

5. The system of claim 1, wherein the separate mutual fund has an income strategy.

6. The system of claim 1, wherein the original mutual fund and the separate mutual fund are separately managed.

7. The system of claim 1, wherein the asset-reallocation application executed by the processor is further configured to:
after transferring the asset from the original mutual fund's secondary portfolio to the separate mutual fund's primary portfolio, purchase at least a second asset to be held in the original mutual fund's secondary portfolio using earnings from the original mutual fund's primary portfolio;
create a second separate mutual fund; and
transfer the second asset from the original mutual fund's secondary portfolio to the second separate mutual fund when the second asset reaches a predetermined size.

8. The system of claim 1, wherein the asset-reallocation application executed by the processor is further configured to:
create a secondary portfolio within the separate mutual fund;
purchase at least a second asset to be held in the separate mutual fund's secondary portfolio using earnings from the separate mutual fund's primary portfolio;
create a second separate mutual fund; and
transfer the second asset from the separate mutual fund's secondary portfolio to the second separate mutual fund when the second asset reaches a predetermined size.

9. A system comprising:
a processor configured to execute an asset-reallocation application automatically,
wherein the asset-reallocation application executed by the processor is configured to:
seed a secondary portfolio within a mutual fund using gains earned by a primary portfolio of the mutual fund;
grow the secondary portfolio over time by continuing to direct gains from the primary portfolio to the secondary portfolio;
split off the secondary portfolio from the mutual fund when the secondary portfolio reaches a predetermined size; and
continue seeding and growing additional portfolios within the mutual fund using the primary portfolio's gains.

10. The system of claim 9, wherein the continue seeding and growing additional portfolios within the mutual fund using the primary portfolio's gains comprises:
after the secondary portfolio has been split off, seed a third portfolio within the mutual fund using gains earned by the primary portfolio of the mutual fund;
grow the third portfolio over time by continuing to direct gains from the primary portfolio to the third portfolio; and
split off the third portfolio from the mutual fund when the third portfolio reaches a predetermined size.

11. The system of claim 9, wherein the asset-reallocation application executed by the processor is further configured to:
establish the secondary portfolio as a separate mutual fund;
seed a third portfolio within the separate mutual fund using gains earned by the secondary portfolio of the separate mutual fund;
grow the third portfolio over time by continuing to direct gains from the secondary portfolio to the third portfolio; and
split off the third portfolio from the separate mutual fund when the third portfolio reaches a predetermined size.

12. A computer implemented method comprising:
using a computer processor to reallocate a portion of a mutual fund's assets automatically by:
establishing a conservative portion of the mutual fund by allocating gains earned by a growth portion of the mutual fund to the conservative portion;
growing the conservative portion over time by investing gains from the growth portion in the conservative portion;
creating a separate mutual fund by separating the conservative portion from the mutual fund when the conservative portion reaches a predetermined size; and
continuing to establish and grow additional conservative portions of the mutual fund with the gains earned by the growth portion of the mutual fund.

13. The method of claim 12, wherein the continuing to establish and grow additional conservative portions of the mutual fund within the gains earned by the growth portion of the mutual fund further comprises using the processor to:

after separating the conservative portion from the mutual fund, establishing a second conservative portion of the mutual fund by allocating gains earned by the growth portion of the mutual fund to the second conservative portion;

growing the second conservative portion over time by directing gains from the growth portion to the conservative portion; and creating a second separate mutual fund by separating the second conservative portion from the mutual fund when the second conservative portion reaches a predetermined size.

14. A method for reallocating assets held in a primary portfolio of an original mutual fund, the method comprising automatically reallocating a portion of a mutual fund's assets using a computer processor by:

creating a secondary portfolio within the original mutual fund;

purchasing at least one asset to be held in the secondary portfolio using earnings from the primary portfolio;

growing the asset by directing earnings from the primary portfolio to the secondary portfolio;

creating a separate mutual fund;

transferring the asset from the secondary portfolio of the original mutual fund to a primary portfolio of the separate mutual fund when the asset reaches a predetermined size; and continuing to purchase and grow additional assets to be held in additional portfolios by directing earnings from the primary portfolio to the additional portfolios.

15. The method of claim 14, wherein the assets of the primary portfolio of the original mutual fund are stocks.

16. The method of claim 14, wherein the asset of the secondary portfolio is a conservative income product.

17. The method of claim 14, wherein the primary portfolio of the original mutual fund has a growth strategy.

18. The method of claim 14, wherein the separate mutual fund has an income strategy.

19. The method of claim 14, wherein the original mutual fund and the separate mutual fund are separately managed.

20. The method of claim 14 further comprising:

after transferring the asset from the original mutual fund's secondary portfolio to the separate mutual fund's primary portfolio, purchasing at least a second asset to be held in the original mutual fund's secondary portfolio using earnings from the original mutual fund's primary portfolio;

creating a second separate mutual fund; and transferring the second asset from the original mutual fund's secondary portfolio to the second separate mutual fund when the second asset reaches a predetermined size.

21. The method of claim 14 further comprising:

creating a secondary portfolio within the separate mutual fund;

purchasing at least a second asset to be held in the separate mutual fund's secondary portfolio using earnings from the separate mutual fund's primary portfolio;

creating a second separate mutual fund; and transferring the second asset from the separate mutual fund's secondary portfolio to the second separate mutual fund when the second asset reaches a predetermined size.

\* \* \* \* \*